June 10, 1969 P. A. LOMOLINO 3,448,618
LIQUID LEVEL INDICATING ELEMENT
Filed June 28, 1967
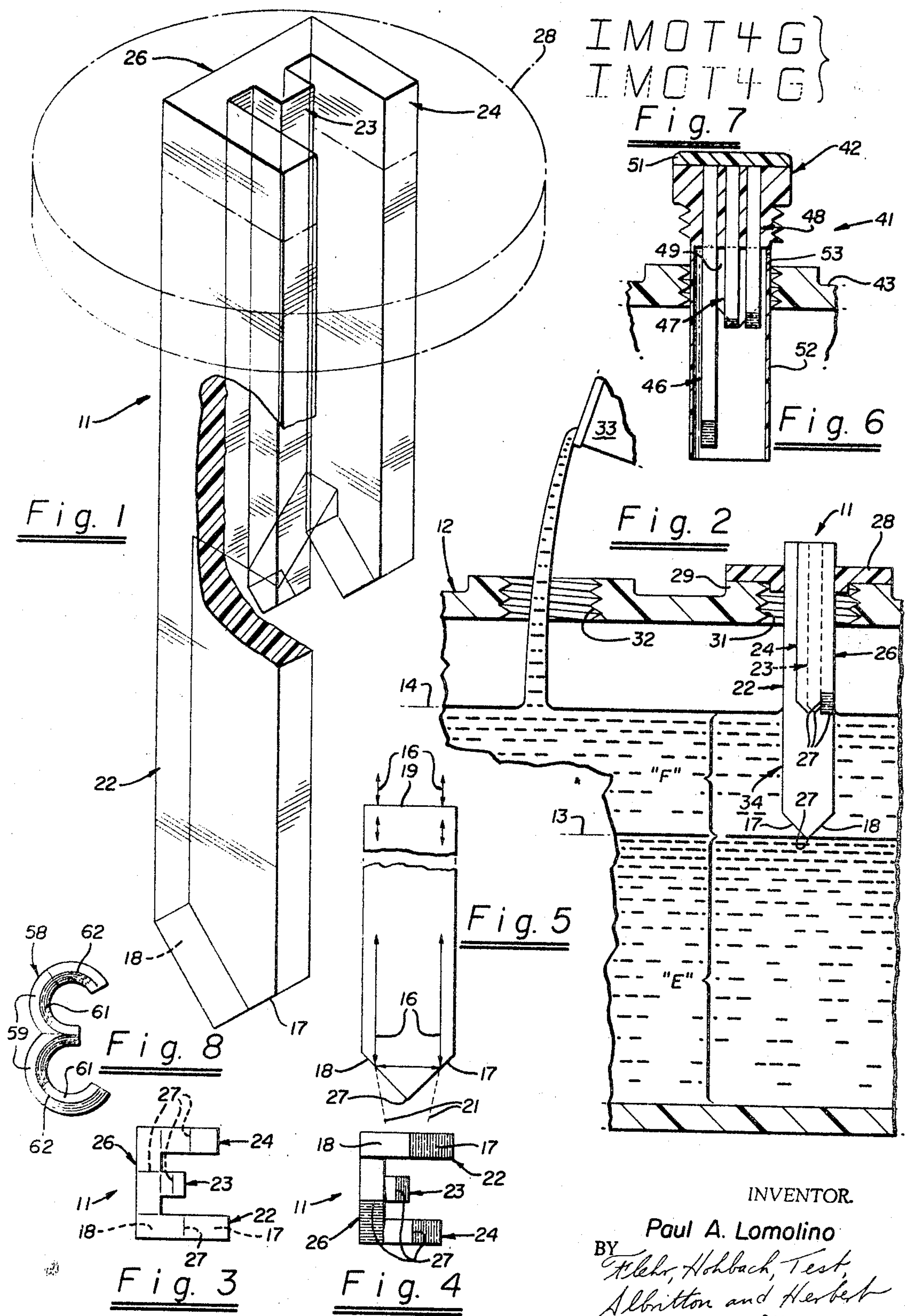
INVENTOR.
Paul A. Lomolino
BY Fleht, Hohbach, Test, Albritton and Herbert
Attorneys United States Patent Office 3,448,618

Patented June 10, 1969

3,448,618

LIQUID LEVEL INDICATING ELEMENT

Paul A. Lomolino, 3769 Farm Hill Blvd., Redwood City, Calif. 94061

Filed June 28, 1967, Ser. No. 649,554

Int. Cl. G01f 23/02

U.S. Cl. 73—327 5 Claims

ABSTRACT OF THE DISCLOSURE

An element illuminated by natural light changes from a first character configuration to a second character configuration depending upon the level of liquid within a fluid container such as a storage battery. When liquid is below a desired level, the character formed by the element is illuminated as a letter such as "E." When the liquid level is above a desired level, the element is illuminated as another letter, such as the character "F." Illumination of the character-forming components is obtained by light reflected from inclined surface portions of the element when these surfaces are exposed to air but not when they are in contact with liquid.

*Background of the invention and objects*

This invention pertains to liquid level indicating devices and more particularly to a liquid level indicating element adapted to be carried by a closed container to extend downwardly into liquid in the container, such as a storage battery, so as to give indication of the level of liquid within the container.

This invention more particularly pertains to such an indicating element of a type where the lower end of the depending portions of the element are formed with oppositely disposed obliquely inclined surfaces at an angle of inclination so related to the refractive index of the material of the element as to substantially totally reflect upwardly the light passing downwardly in the element when the lower end of the depending portion is uncovered by liquid and to transmit refracted light into liquid when the lower end is immersed into same.

It is a general object of the present invention to provide an improved liquid level indicating element wherein the illuminated configuration of the element changes from one character to another depending upon the liquid level within the container.

It is another object of the present invention to provide a liquid level indicating element of the type described above wherein the character configurations to be illuminated are essentially hidden or obscured from view until such time as the character-forming components thereof become illuminated by provision of an air interface with the lower end of the depending portions thereof.

These and other objects of the invention will become more readily apparent when considered in conjunction with the following drawings, in which:

FIGURE 1 is a perspective view of a liquid level indicating element, according to the invention;

FIGURE 2 is an elevation cross-section showing the liquid level indicating element of FIGURE 1 in position as carried in a storage battery;

FIGURE 3 is a top plan view of the central portion of the element shown in FIGURE 1;

FIGURE 4 is a plan view, viewed from below, of the central portion of the element shown in FIGURE 1;

FIGURE 5 is a diagram showing light paths within a portion of the element shown in FIGURE 1;

FIGURE 6 shows, in elevation section, another embodiment, according to the invention, with certain portions of the element remaining unsectioned;

FIGURE 7 is a chart showing various additional pairs of alphanumeric characters adapted to be converted from one to the other, depending upon liquid level within the container, according to the invention; and FIGURE 8 shows an elongated element of arcuate transverse cross-section which can serve to form a configuration of the type discolsed herein.

*Summary of the invention*

In general, a liquid level indicating element adapted to be carried by a closed container, such as a storage battery, is arranged to extend downwardly into liquid within the container. The element gives indication of the level of the liquid at levels below and above a given norm.

Generally, the element comprises downwardly depending transparent component parts in the form of elongated members, such as bars. The bars have a transverse cross-section which individually respectively constitute character-forming components common to a plurality of characters, the lower ends of the bars are exposed to contact liquid in the container and are formed with oppositely disposed obliquely inclined surfaces at an angle of inclination so related to the refractive index of the material of the bars as to substantially totally reflect upwardly the light passing downwardly in the bars whenever their lower ends are uncovered by liquid. On the other hand, the inclined surfaces serve to transmit refracted light into the liquid whenever their lower ends are covered by the liquid. The upwardly reflected light serves to illuminate its associated bar so as to define a given character-forming component in accordance with the transverse cross-section configuration of the illuminated bar.

Another such bar constitutes a character-forming component which is included in only one of the two characters previously mentioned. The lower end of the last named bar extends downwardly to a level which is different from the level of the lower ends of the other bars so as to contact liquid at a different level and to thereby extinguish this associated illuminated character-forming component at a level different from the extinguishing level for the other bars. Thus, preferably, this different level is below the level of the inclined surfaces at the lower ends of the other bars so as to remove the illumination from one of the character-forming components prior to extinguishing the illumination of the others.

In this manner, preferably, the letter "E" (as in "Empty") can be formed and illuminated by all of the character-forming components constituting the element. Then, as the liquid level comes into contact with the lower end of that character-forming component which constitutes the bottom "leg" of the "E," such bottom "leg" will be extinguished and the "E" will become an "F" (as in "Full").

It will also be readily apparent that if the liquid level exceeds the level defined by the lower ends of those character-forming components which comprise the "F," the "F" will itself become extinguished and no letter will be illuminated. Thus, a second level of liquid is indicated which might, for example, indicate that the container had been overfilled.

*Description of the preferred embodiments*

Referring to the drawings, a liquid level indicating element 11 is shown, as now to be described, for forming the letter "E" when the liquid level in its associated container 12 falls below that particular given norm represented by level 13 and for forming the illuminated letter "F" when the level of liquid lies between line 13 and the level represented by line 14.

It is to be understood that whenever the liquid level rises above the level indicated by the line 14 that the character configuration represented by element 11 will not be illuminated at all and hence will appear upon a dark background.

It has been previously observed, that where an elongated upright rod consists of any good transparent material, such as glass or Lucite or quartz having an index of refraction in the order of that of glass, if the lower end is shaped with oppositely obliquely inclined faces at angles preferably on the order of forty-five degrees to the vertical, when the lower end of such a rod is not immersed in liquid and light shines on its upper end, a beam such as indicated by lines 16 passing downwardly in the rod or bar will be completely reflected at the surfaces 17, 18 in the directions shown and be turned back upwardly in the rod with the result that this and other similarly reflected rays will cause the upper end surface 19 of the rod to appear to be relatively bright, hereinafter referred to as "illuminated."

On the other hand, when the lower end of the rod is immersed in liquid, the rays of downwardly directed light will not be completely reflected at the surfaces 17, 18 but will be slightly refracted and dispersed into the liquid as indicated by the dotted lines 21. Such rays of light refracted into the liquid will be absorbed by the liquid and, consequently, the upper end 19 of the rod will appear relatively dark in contrast with its appearance when the end of the rod was free of liquid.

Element 11 includes components in the form of downwardly depending bars 22, 23 and 24 respectively forming the three "legs" of the character "E," and a downwardly depending bar 26 forming the "back" of the "E." More particularly, it is the transverse cross-section of each individual bar which respectively constitutes the character-forming component.

The lower ends of each bar 22–24, 26 are tapered at an angle on the order of forty-five degrees to the horizonal and are brought to a sharp point so as to form only the slightest shadow line 27 in order to minimize the loss in illumination at the upper end of element 11. Thus, it is to be understood that where the inclined surfaces intersect, light will not be reflected upwardly along the bar and thus due to such light loss, a shadow line 27 will be formed.

Each bar 22–24, 26 is formed as a relatively thin, broad elongated member. The lower ends of each member are formed by tapering the breadth dimension down to a line of intersection 27 so that the tapered surfaces extend as much as possible and thereby provide a more gradual transistion from bright to dark as liquid contacts the inclined surfaces. Thus, it is preferred to form the lower ends of each bar 22–24, 26 whereby the inclined surfaces will be formed to taper the breadth dimension and thereby extend the period of liquid contact therewith during filling of container 12 as much as possible for the given angle of forty-five degrees.

Element 11 can be formed as a unitary construction by molding all of the bars 22–24, 26 as a single integral piece. On the other hand, each bar can be formed individually. They can then be cemented together to form the configuration shown. Means for mounting element 11 in a storage battery or other container 12 comprises the disc 28 of similar material to that of bars 22–24, 26 and dimensioned to be secured, as by cementing, to the boss 29 encircling one of two filling ports 31, 32 of container 12. If desired, an additional opening can be provided specifically for purposes of accommodating entry of element 11 and attachment of disc 28 to the margin around same.

From the foregoing description, it should be readily apparent that the liquid level indicating element 11 is installed in a storage battery or other container 12 and performs as follows.

Initially, element 11 is inserted into port 31 and disc 28 cemented to boss 29 on the outside of container 12. As thus disposed, and assuming that no liquid is present within container 12, light from outside container 12 passing downwardly along all bars 22–24, 26 will be reflected by the inclined surfaces at their lower ends and returned directly upwardly so as to illuminate the configuration of element 11 as viewed from above. Thus, a relatively bright "E" will appear indicating, for example, that container 12 is empty.

By pouring liquid via port 32 into container 12, as from a cup 33, the liquid will ultimately rise until it immerses or covers the inclined surfaces at the lower end of bar 22. As the liquid gradually covers these surfaces, the lower "leg" 34 (FIGURE 2) of the "E" will first become darkened and ultimately eliminated to view whereby the remaining character-forming components common to the letter "F" will remain bright and form an "F" until such time as the level of liquid rises to a point covering their respective inclined surfaces, as at the level indicated by line 14.

An subsequent addition of liquid to container 12 will cause the level of liquid to rise above the inclined surfaces of these latter character-forming components and will therefore extinguish the illumination thereof so that no character remains visible or apparent. This condition can, of course, represent an overfilled condition. If desired, an "I" could then be formed by eliminating illumination for the legs of the "E" while continuing to illuminate the "back" of the "E."

The foregoing arrangement wherein the liquid level indicating element 11 is permanently installed in the casing of the container 12 has the advantage of constantly monitoring the influx of liquid being supplied to the container whereby the person pouring liquid into the container can immediately terminate filling upon indication that the level line has risen to the proper heights.

According to another embodiment, as shown in FIGURE 6, a liquid level indicator element 41 is arranged for incorporation into the filing plug 42 of a container such as a storage battery 43. Bars 46, 47, 48 and 49 corresponding to bars 22–24, 26 respectively are cemented to the transversely extending transparent top or cap 51 of plug 42. Plug 42 is further formed with a downwardly extending cylindrical extension 52 formed at its upper end with a vent 53 which serves to permit entrapped air to escape therefrom when plug 42 is being inserted into storage battery 43.

Cylinder 52 serves further to protect bars 46–49 when plug 42 is removed for purposes of filling battery 43.

The top construction of plug 42 wherein the transversely extending cap 51 lies across the upper ends of the bars 46–49 has the advantageous effect of serving to obscure the character configuration defined by the upper ends of bars 46–49 at all times other than when the upper ends of such bars are illuminated. Thus, the flat transparent cap 51 is disposed across the tops of the bars in light transmitting relation therebetween and serves to obscure the upper end of the character-forming components except to the extent that the lower ends thereof are uncovered by liquid.

It will be further apparent that the transversely extending flat cap 51 can readily be applied to the permanently installed construction shown in FIGURE 2 if it were desired to obscure the "E" configuration thereof from view.

Further, if desired, the plane of the upper ends of the bars can be tipped as much as 90° to the axis of the bars, if gradually done, since the piping of the light around curved pipes is readily accomplished and in some applications it may be desirable to have the character disposed upright.

Finally, it is to be understood that additional pairs of characters can be formed wherein certain components are common to each, and by eliminating an additional component or two, one character can be converted to another and thereby indicate a change in condition of the liquid level within the container.

Thus, as shown in FIGURE 7, there is provided a chart indicative of the conversion of a first character shown in the upper row thereof to an associated second alphanumeric character shown in the lower row. Accordingly, where various languages may be employed, different character configurations may be desired to be utilized. For English-speaking purposes, however, it is preferred to employ the two characters "E" and "F" represented of "Empty" and "Full."

While the elongated members of the elements shown as bars 22 in FIGURES 1 through 7 have been shown as elements formed with a rectangular transverse cross-section, and formed at their lower ends with inclined surfaces 17, 18, other configurations of these bars or elements may comprise a component of the type shown in FIGURE 8. FIGURE 8 shows an elongated element 58 having an arcuate transverse cross-section and formed at its lower end with bevelled surfaces 59, 61 disposed at an angle on the order of 45°. The lower edge 62 may lie in a plane substantially at right angles to the axis of element 58.

What is claimed is:

1. A liquid level indicating element adapted to be carried by a closed container and extend into liquid within same to give indication of the level of said liquid at levels below and above a given norm, said element comprising transparent parts of transverse cross-section individually respectively constituting character-forming components common to two characters, the lower ends of said parts being exposed to contact liquid in the container and formed with oppositely disposed obliquely inclined surfaces at an angle of inclination so related to the refractive index of the transparent material of said parts as to substantially totally reflect the light passing via said parts when their lower ends are uncovered by liquid, and to transmit refracted light into liquid when their lower ends are covered by liquid, said reflected light serving to illuminate an associated part to define a given character-forming component, another one of said parts constituting a character-forming component included in only one of said two characters, the lower end of the last named part extending downwardly to a level different from the level of the lower ends of the other parts to contact liquid at a different level to extinguish its associated illuminated character-forming component at a level different from the extinguishing level for the other parts and thereby to define a first character derived from the illustrated components prior to extinguishing the illumination of said last named part, and to define a second character derived from the components remaining illuminated subsequent to such extinguishment whereby the illumination of one or the other of two characters depends on the liquid level within the container.

2. An indicating element as defined in claim 1 wherein said parts are formed as elongated elements and further including, in combination therewith, a flat transparent member disposed across the tops of said elements in light transmitting relation therebetween, said member serving to obscure the upper end of said characters to the extent that the lower ends of the elements thereof are covered by said liquid.

3. An indicating element according to claim 1 further including a plug for capping a filling port of a container and an elongated cylinder depending from said plug and disposed in protective spaced relation about said parts, said cylinder being vented at the upper end thereof to release air entrapped therein upon inserting said plug into said port.

4. A liquid level indicating element adapted to be carried by a closed container to extend downwardly into liquid within same to give indication of the level of said liquid at levels below and above a given norm, the transverse cross-section of said element forming the letter "E" comprised of downwardly depending bars of transparent material respectively constituting each leg component and the back component of the "E," the lower ends of said bars being exposed to contact liquid in the container and formed with oppositely disposed obliquely inclined surfaces at an angle of inclination so related to the refractive index of said bar material as to substantially totally reflect upwardly the light passing downwardly in said bars when their lower ends are uncovered by liquid, and to transmit refracted light into liquid when their lower ends are covered by liquid, said upwardly reflected light serving to illuminate the associated bars defining the leg and back components of said "E" when said lower ends are uncovered, the lower end of that one bar forming the bottom leg of the "E" extending downwardly to a level below the level of the lower ends of the other bars to be first to contact liquid at the lowest of said levels and extinguish its associated illuminated "E" component and thereby to define an "F" derived from the remaining illuminated "E" components.

5. An indicating element according to claim 4 further including a plug for capping a filling port of a container, and an elongated cylinder depending from said plug and disposed in protective spaced relation about the full length of all said bars, said cylinder being vented at the upper end thereof to release air entrapped therein upon inserting said plug into said port.

References Cited

UNITED STATES PATENTS

| | | | |
|---|---|---|---|
| 1,485,772 | 3/1924 | Du Pont | 116—118 |
| 2,100,148 | 11/1937 | Parker. | |
| 2,123,479 | 7/1938 | Spencer | 73—327 |
| 2,190,027 | 2/1940 | Jordan | 116—118 |
| 2,368,705 | 2/1945 | Du Pont et al. | 73—327 |
| 2,468,833 | 5/1949 | Murphy. | |
| 2,615,337 | 10/1952 | Maybach | 73—327 |

FOREIGN PATENTS

| | | |
|---|---|---|
| 201,982 | 4/1923 | Great Britain. |

LOUIS R. PRINCE, *Primary Examiner.*

D. M. YASICH, *Assistant Examiner.*

U.S. Cl. X.R.

40—28; 350—96